United States Patent [19]

Korthuis

[11] Patent Number: 4,982,558

[45] Date of Patent: Jan. 8, 1991

[54] COUNTERWEIGHT METHOD AND SYSTEM FOR A BEATER ROD OF A HARVESTER

[75] Inventor: Scott A. Korthuis, Lynden, Wash.

[73] Assignee: Korvan Industries, Lynden, Wash.

[21] Appl. No.: 414,908

[22] Filed: Sep. 29, 1989

[51] Int. Cl.$^5$ ............................................. A01D 46/26
[52] U.S. Cl. .................................... 56/12.6; 56/340.1
[58] Field of Search ........................ 56/12.4, 12.5, 12.6, 56/340.1, DIG. 19, 330, 328.1; 74/37, 61

[56] References Cited

U.S. PATENT DOCUMENTS

| 3,000,226 | 9/1961 | Muehlhausen | 56/12.6 |
| 3,546,864 | 12/1970 | White | 56/12.6 |

FOREIGN PATENT DOCUMENTS

| 0858637 | 8/1981 | U.S.S.R. | 56/340.1 |
| 1109087 | 8/1984 | U.S.S.R. | 56/340.1 |
| 2033197 | 5/1980 | United Kingdom | 56/330 |

Primary Examiner—Bruce M. Kisliuk
Attorney, Agent, or Firm—Hughes & Multer

[57] ABSTRACT

A drive system to move a moveable beater assembly of a harvesting machine in a back and forth movement comprises a housing, a drive, and a drive compensating component. The drive drives the beater assembly in a back and forth movement so that a beater assembly force is exerted on the housing, this force being directed along an alignment axis. The drive compensating component comprises first and second eccentrically revolving weights mounted to the housing for rotation. It further comprises a drive transmission to rotate the first and second weights to produce a net compensating force that is colinear with the alignment axis. In a timed relationship with the back and forth movement of the beater assembly, the net compenating force opposes colinearly the beater assembly force, whereby an equilibrium of the housing is able to be maintained.

13 Claims, 4 Drawing Sheets

COUNTERWEIGHT METHOD AND SYSTEM FOR A BEATER ROD OF A HARVESTER

BACKGROUND OF THE INVENTION

The present invention relates generally to a harvesting machine having an improved crop beater drive system with counterweights for eliminating vibration.

DESCRIPTION OF THE PREFERRED EMBODIMENT

Figure 1:
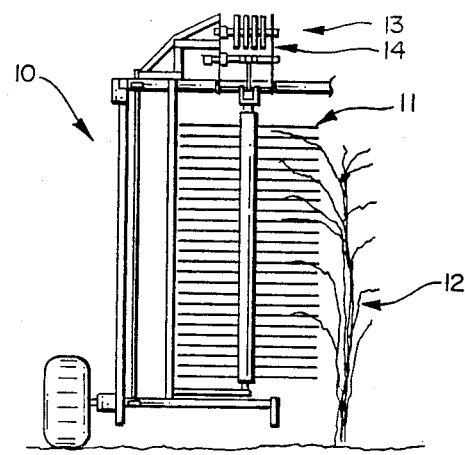
FIG. 1 is a general view from the front showing the crop beater drive system and beater rod assembly of the present invention positioned in a harvesting machine.

As shown in the general view of FIG. 1, a harvesting machine 10 has a vertically moveable crop beater rod assembly 11 which beats upstanding crops 12 so as to dislodge produce from the crops 12. The present invention 13 is directed at providing a drive system for driving the up and down motion of the crop beater rod assembly 11 while using counterweights to eliminate reaction vibrations.

Figure 2:
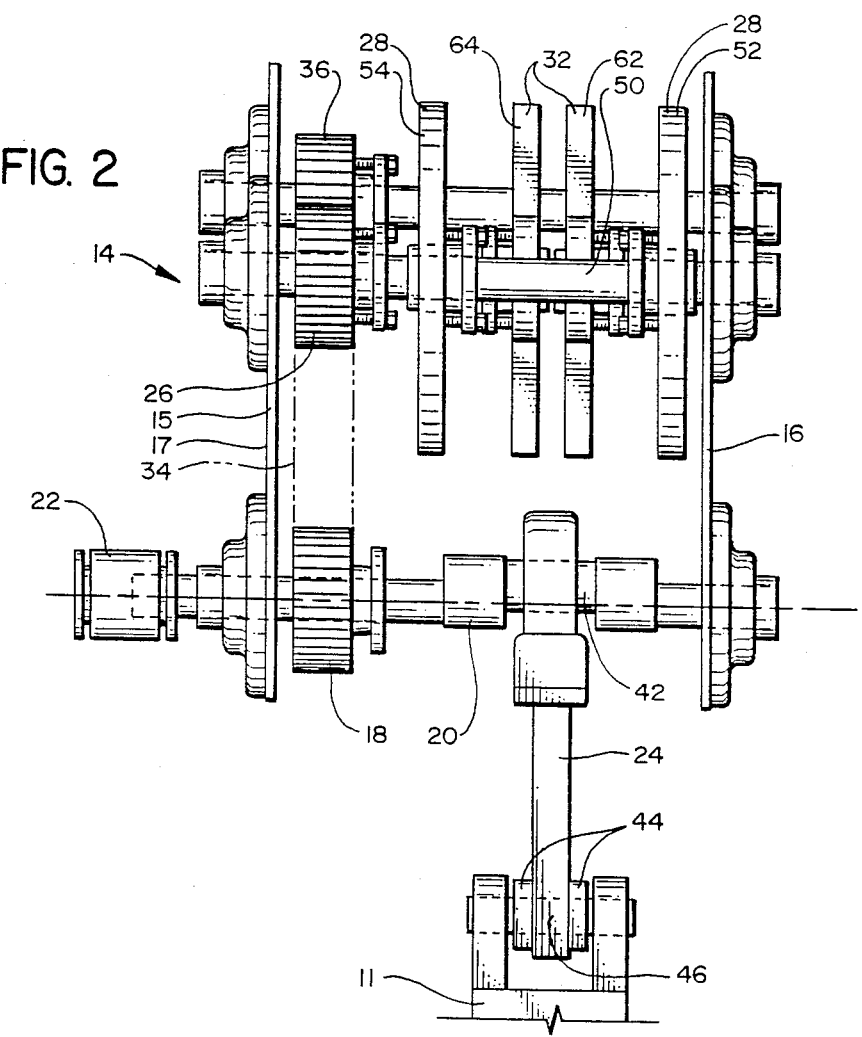
FIG. 2 is a front view of the drive system of the present invention.
Figure 3:
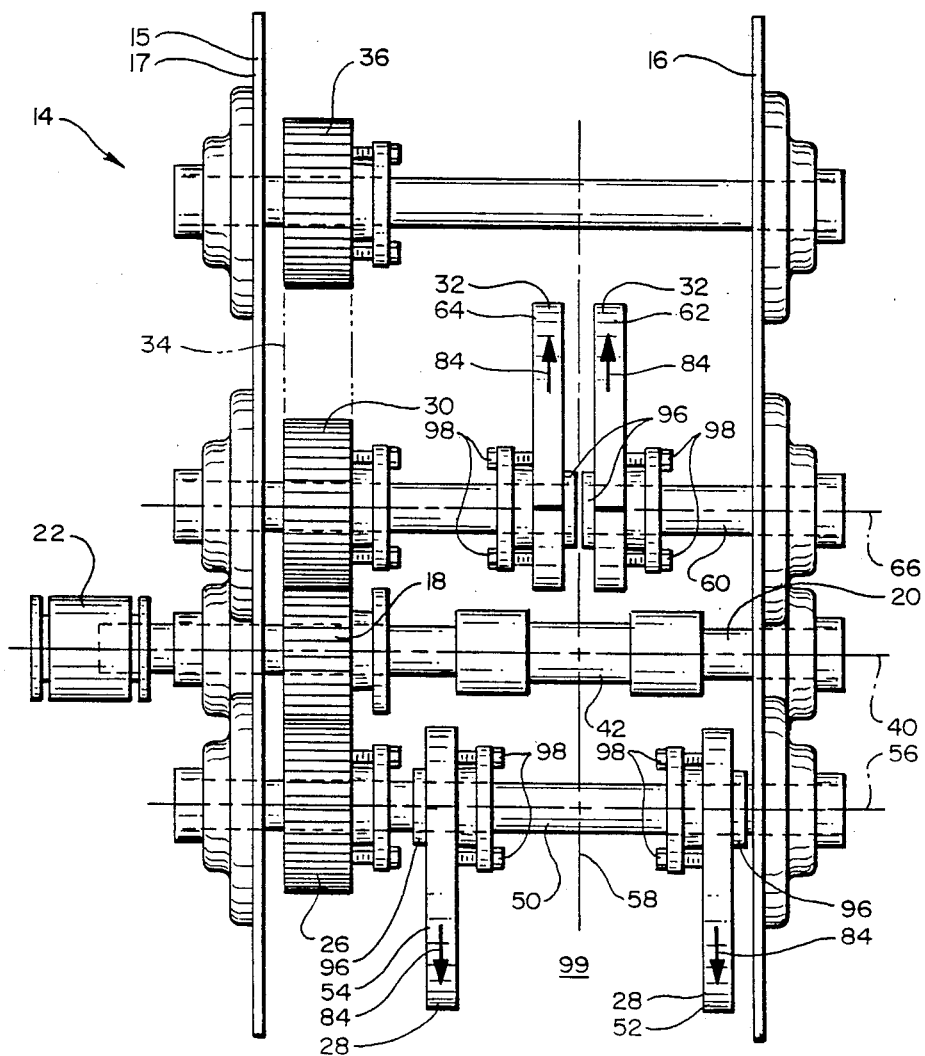
FIG. 3 is a top view of the system of the present invention.

As shown in the top view of the drive system 14 of FIG. 3, the drive system 14 is contained in a housing which comprises a right wall 16 and a left wall 17. For purposes of orientation, the terms right and left will denote the directions right and left as seen in FIG. 3. The terms "forward" and "forwardly" will indicate a direction toward, or a proximity to, the bottom of FIG. 3, while the terms "rearward" and "rearwardly" will denote the opposite. (Thus, FIGS. 1 and 2 are front views and FIG. 4 is a left side view of the drive system 14.)

There are, as shown in FIG. 2, a driver wheel 18 and a crankshaft 20, which are both turned by rotation of a drive shaft 22, which is in turn driven by a drive motor (not shown). The rotation of the crankshaft 20 causes a connecting rod 24 to reciprocate up and down, which makes the entire crop beater assembly 11 shake up and down. As shown in FIG. 4, the rotation of the driver wheel 18 acts to rotate both a front wheel 26, which revolves a front weight assembly 28, and a rear wheel 30, which revolves a rear weight assembly 32, with the turning of the driver wheel 18 and the front weight assembly 28 being in the same direction, and with the turning of the front weight assembly 28 and the rear weight assembly 32 being in opposed directions. As will be explained hereinbelow, this coordinated motion of the weight assemblies 28 and 32 counteracts substantially all of the oscillation of the beater rod assembly 11.

Figure 4:
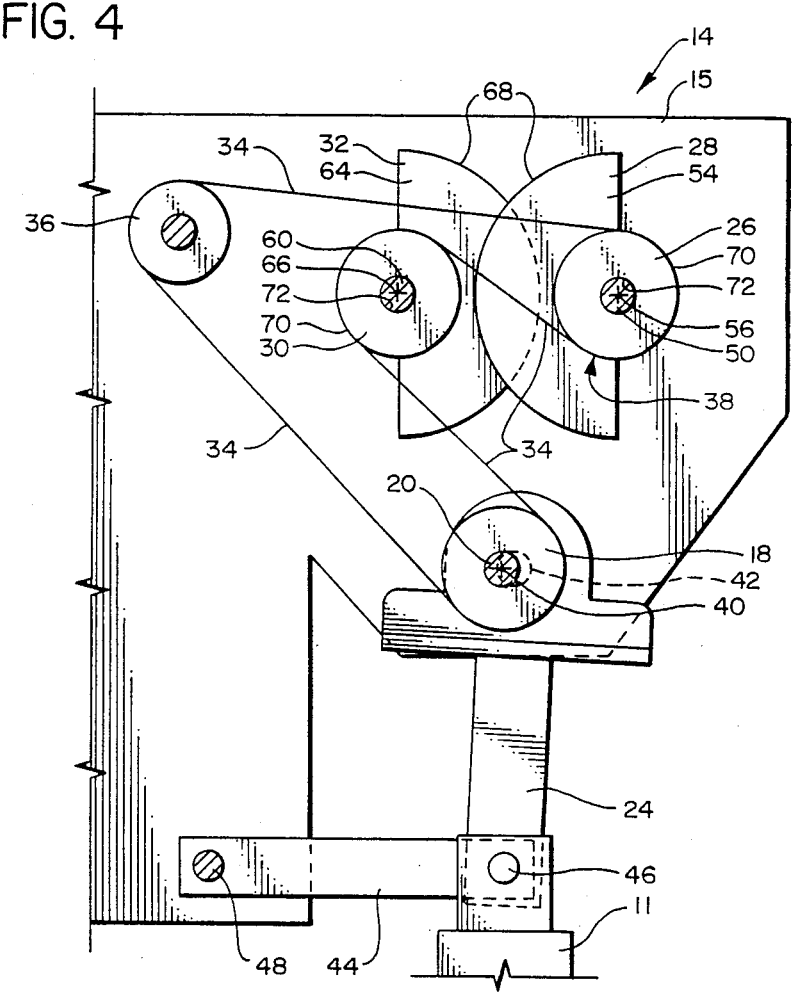
FIG. 4 is a view of the system of the present invention looking from the left through a housing.

When the drive shaft 22 turns the driver wheel 18, the driver wheel 18 drives an endless belt 34, which, as seen in FIG. 4, follows a path which proceeds from the driver wheel 18 around the rearward side of an idler wheel 36 around the top and around the forward side of the front wheel 26 to a point indicated at 38, then over and around the top, and down the rearward side, of the rear wheel 30, thence down around the forward side of the driver wheel 18 to the place of beginning. The rotation of the driver wheel 18 makes the idler wheel 36 rotate in the same direction as the driver wheel 18, while making the front and rear wheels 26 and 30 rotate in their described directions. Inasmuch as the driver wheel 18, the front wheel 26, and the rear wheel 30 all have the same circumference, these three wheels all rotate with the same rotational speed.

As seen in FIG. 2, the rotation of the crankshaft 20 about a central crank axis 40 causes an eccentric portion 42 of the crankshaft 20 to perform an up and down circular motion about the crank axis 40, that alternately raises and lowers the connecting rod 24, which in turn is attached swingably to, and which raises and lowers, the beater rod assembly 11. For guiding the beater rod assembly 11 in a substantially vertical motion, one end of a lever arm 44 shown in FIG. 4 is also swingably attached at 46 to the beater rod assembly 11 and the other end of the lever arm 44 is attached swingably to a stationary member 48 of the drive system housing 15. Referring now to FIG. 3, there is a laterally disposed front shaft 50 that is fixedly attached to the front wheel 26 and also to a right front plate 52 and a left front plate 54, with the plates 52 and 54 constituting the front weight assembly 28. Rotation of the front wheel 26 rotates the front shaft 50 which causes the two plates 52 and 54 to revolve about a front axis 56, which is also the rotational axis of the front shaft 50, with the plates 52 and 54 being about equal in mass and being mounted to the front shaft 50 in a manner that during their revolution the plates 52 and 54 remain parallel to, and equidistant from, an imaginary reference plane 58 that is perpendicular to the front axis 56. There is also a rear shaft 60 disposed laterally, which is at the same vertical height as the front shaft 50 and which is fixedly connected to the rear wheel 30 and to a right rear plate 62 and a left rear plate 64, with the plates 62 and 64 constituting the rear weight assembly 32. The rotation of the rear wheel 30 acts to revolve the plates 62 and 64 about a rear axis 66 which is also the rotational axis of the rear shaft 60, with the plates 62 and 64 being mounted to the rear shaft 60 in a manner that during their revolution the plates 62 and 64 remain parallel to, and equidistant from, the reference plane 58.

As shown in FIG. 4, the plates 52, 54, 62, and 64, each have the same outline configuration which comprises a large semi-circular portion 68 and a small semi-circular portion 70, with straight edges of the semi-circular portions 68 and 70 adjoining one another, and with a hole being provided at a common center 72 for purposes of mounting the plate on the shafts 50 and 60. When the plates are so mounted, individual centers of mass of the plates 52, 54, 62, and 64, are displaced from the respective rotational axes 56 and 66, so that the plates make eccentrically revolving weights.

Figure 5:
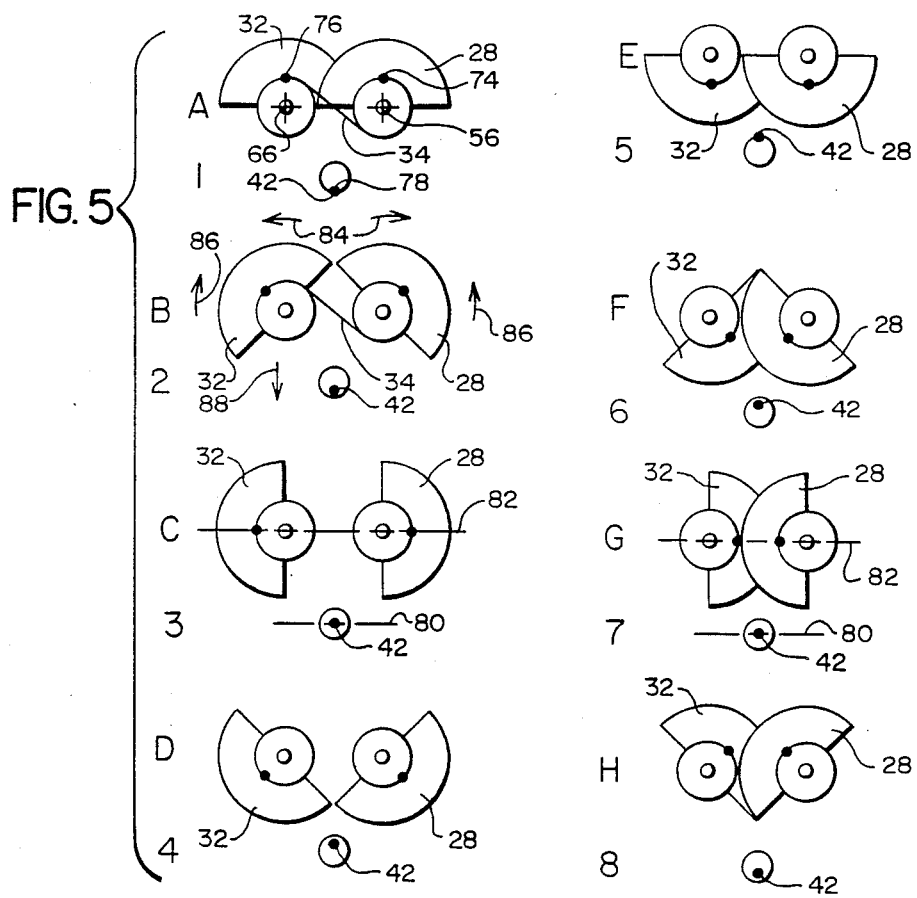
FIG. 5 is schematic views illustrating the motions of the counterweights of the present invention which are shown in the lettered rows A through H, and of the oscillating crank of the present invention, which is shown in the numbered rows 1 through 8.

Let it be assumed that the harvesting machine 10 is to be operated and that the resulting vibration in the machine 10 is to be counteracted, with the further assumption being made that the drive shaft 22 is to rotate clockwise thereby turning the crankshaft 20 clockwise so as to oscillate the beater rod assembly 11. In this case, the driver wheel 18 will rotate clockwise so as to turn the front wheel 26 clockwise and the rear wheel 30 counter clockwise. As shown in Row A of FIG. 5, at the beginning of an oscillation cycle, the front weight assembly 28 and the rear weight assembly 32 are both positioned with their respective centers of mass, which are indicated by dark spots at 74 and 76, respectively, at top positions. At this same moment as shown in Row 1 of FIG. 5, the eccentric portion 42 of the crank shaft 20, which is indicated by the dark dot 78, is at a bottom position. As the endless belt 34 rotates as seen in Rows B and 2, the eccentric portion 42 moves slightly upwardly (which moves slightly upwardly of the beater rod assembly 11), while the front weight assembly 28 rotates forty five degrees clockwise and the rear weight assembly 30 rotates forty five degrees counterclockwise, thereby lowering slightly the weights' centers of mass. In Rows C and 3, it can be seen that when the eccentric portion 42 of the crankshaft 20 is at a neutral position, which is indicated by a horizontal line 80, the respective centers of mass of the weight assemblies 28 and 32 are also at a corresponding neutral position, which is indicated by the horizontal line 82. With further rotation through the positions pictured in Rows D and 4, and to the positions shown in Rows E and 5, the eccentric portion 42 of the crankshaft 20 is now at a top position (with the beater rod assembly 11 being at a top position in its oscillation). At this instant, the weight assemblies 28 and 32 are at the bottom position of their respective rotations. Continuing, the eccentric portion 42 of the crankshaft 20 and the weight assemblies 28 and 32 rotate again through their respective neutral positions, and then finally, as pictured in Rows H and 8, the eccentric portion 42 of the crankshaft 22 is near to the bottom of its stroke, while the weight assemblies 28 and 30 are almost at the top of their rotational paths. With continued rotation, these components will move further to reach their starting positions, which are pictured in Rows A and 1.

To summarize, the angular displacements of the front weight assembly 28 about the front axis 56, and the rear weight assembly 32 about the rear axis 66, are at all times in phase vertically, and are mirror images of one another horizontally. Additionally, the vertical displacement of the weight assembly 28 and 32 is exactly one half cycle ahead of the vertical displacement of the beater rod assembly 11. During the weights' motions, longitudinal components, which are indicated by the arrows 84 in FIG. 3 and in Row B of FIG. 5, cancel one another out so as to eliminate the occurrence of imbalances. The vertical components (which are indicated by the arrows 86 in Row B) of the centrifugal forces of the weights operate to counteract a vertical force, which is indicated by the arrow 88 and which is exerted by the oscillating beater rod assembly on the machine 10.

Having described the major features of the first embodiment, further details will now be provided.

As seen in FIG. 3, the plates 52, 54, 62, and 64, are fastened to their related shafts 50 and 60 by slipping the plates onto the shaft and fitting a split taper bushing member 96 between the shaft and the plate. The split taper bushing member 96 is then locked into place by screws 98. As shown in FIG. 3, and as is indicated throughout the FIGS. 4 and 5, the plates 52, 54, 62, and 64, each are maintained during their rotations in laterally aligned relation in a manner that the right front plate 52 is laterally aligned with the left front plate 54, and the right rear plate 62 is laterally aligned with the left rear plate 64. The front plates 52 and 54 define therebetween a plate swinging area 99 through which the rear plates 62 and 64 may freely swing during their rotation, so as to avoid colliding with the plates 52 and 54.

Figure 6:
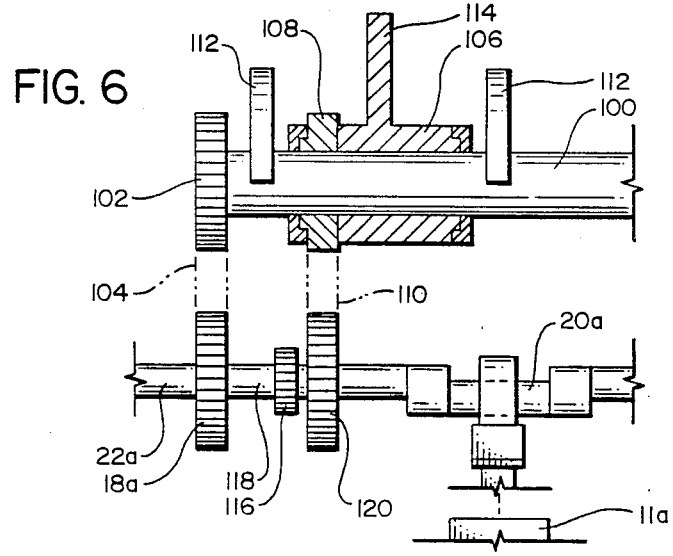
FIG. 6 is a front view of a second embodiment of the system of the present invention.

To describe a second embodiment of the present invention, wherein like components will have like numerical designations as in the first embodiment with the letters "a" added, there is shown in FIG. 6 a shaft 100 attached to a pulley 102 driven by a belt 104 so as to rotate the shaft in a first direction. There is a sleeve 106 mounted concentrically with the shaft 100 and surrounding the shaft 100. This sleeve 106 is fixedly attached to a second pulley 108 which in turn engages a belt 110 which is powered so as to rotate the sleeve 106 in a direction opposite to the direct of rotation of the shaft 100. The shaft 100 has two counterweights 112 mounted to the shaft 100 at the same angular location. There is a counterweight 114 which is fixedly connected to the sleeve 106.

The system is arranged so that when the two weights 112 are extending horizontally in one direction, the counterweight 114 is spaced angularly 180 degrees from the weights 112 so as to extend horizontally in the opposite direction. It is readily apparent that as the shaft 100 and the sleeve 106 are rotated at the same speeds, the weights 112 and 114 function in a manner to develop counteracting vertical forces, while cancelling out any lateral forces developed by the weights 112 and 114.

It is to be understood that there would be a suitable drive transmission to rotate the shaft 100, the sleeve 106, and the crankshaft 20a which drives the up and down motion of the beater assembly 11a, and this can be accomplished in a manner somewhat similar to the means provided in the first embodiment, with proper modification to impart the appropriate rotational motions to the components. For example, there could be the drive shaft 22a which rotates the crankshaft 20a and which has the drive pulley 18a which is directly connected to the belt 104, with that drive shaft acting through a single gear 116 to engage another gear of a second drive shaft 118 to cause the second drive shaft 118 to rotate in the opposite direction. That second drive shaft could in turn have a drive pulley 120 mounted thereto which would engage the belt 110 so as to rotate the sleeve 106 in the opposite direction with the vertical forces developed by the turning of the counterweights, 112 and 114 exactly counteracting the forces developed by the up and down shaking of the beater rod assembly 11a.

It is to be understood that modifications may be made of the foregoing without departing from the basic teachings of the invention.

What is claimed is:

1. A drive system to move a moveable beater assembly means of a harvesting machine in a back and forth movement, said drive system comprising:
   a. a housing structure;
   b. a drive means driveably connected with said beater assembly means and adapted to drive said beater assembly means in said back and forth movement in a manner that said movement exerts on said housing structure a beater assembly force directed along an alignment axis;
   c. a drive compensating means comprising:
      i. a first eccentrically revolving weight means mounted to said housing structure for rotation;
      ii. a second eccentrically revolving weight means mounted to said housing structure for rotation;

iii. a drive transmission to rotate said first and second weight means in a manner to exert on said housing structure a net compensating force that is colinear with said alignment axis so that said net compensating force, in a timed relationship with said back and forth movement of said beater assembly means opposes colinearly said beater assembly force whereby an equilibrium of said housing structure is able to be maintained.

2. The apparatus as recited in claim 1, wherein said beater assembly means is driven back and forth by rotation of an eccentric crank means which revolves about a crank axis, and said first and second weight means, respectively, rotate about first and second weight aces, said crank axis being separated from said weight axes.

3. The apparatus as recited in claim 1, wherein said weight means comprises two or more pairs of weight members, all of said weight members having the same thickness which is substantially uniform.

4. The apparatus as recited in claim 3, wherein each of said weight members has substantially the same mass.

5. The apparatus as recited in claim 3, wherein each of said weight members has substantially the same size and configuration.

6. The apparatus as recited in claim 3, wherein said weight members are equidistant from and parallel to a reference plane which contains a center of said beater assembly means.

7. The apparatus as recited in claim 1, wherein rotation of said first weight means is driven by first pulley means and rotation of said second weight means is driven by second pulley means; wherein said drive transmission comprises belt means having an interior surface and an exterior surface, said interior surface engaging said first pulley means, an idler pulley means, and a driver which supplies driving power, said exterior surface engaging said second pulley means.

8. A drive system to oscillate a beater assembly means of a harvesting machine back and forth, said drive system comprising:
   a. a drive means driveably connected with said beater assembly means so as to move said beater assembly means in a back and forth movement;
   b. a drive compensating means comprising:
      i. a housing means connected to said beater assembly means in a manner so that said beater assembly means imparts back and forth forces to said housing means.
      ii. a first eccentrically rotating weight means mounted to said housing means for rotation about a first rotational axis;
      iii. a second eccentrically rotating weight means mounted to said housing means for rotation about a second rotational axis which is parallel to said first rotational axis, with a direction of rotation of said second weight means being opposite to a direction of rotation of said first weight means;
      iv. a drive transmission to cause said first and second weight means to rotate in a manner so that when said first weight means is rotating from a bottom location to a top location said second weight means is at the same time moving from its bottom location to its top location, and also in a manner that when the first and second weight means are moving from their bottom to their top location, they have lateral components of motion which are opposite to one another, so that back and forth inertia force components are imparted by the first and second weight means to the housing means, while lateral force components of the first and second weight means cancel each other out, in a manner that only the back and forth compensating inertia force components are generated;
   c. wherein said first and second axes of rotation are coincident with one another.

9. A drive system to move a movable beater assembly means of a harvesting machine in a back and forth movement, said drive system comprising:
   a. a housing structure;
   b. a drive means driveably connected with said beater assembly means and able to drive said beater assembly means in said back and forth movement in a manner that said movement exerts on said housing structure a beater assembly force directed along an alignment axis;
   c. a drive compensating means comprising:
      i. eccentrically revolving weight assembly means mounted to said housing structure for rotation;
      ii. a drive transmission means to rotate said weight means in a manner to exert on said housing structure a net compensating force that is colinear with said alignment axis so that said net compensating force, in a timed relationship with said back and forth movement of said beater assembly means, opposes colinearly said beater assembly force, whereby an equilibrium of said housing structure is able to be maintained.

10. A method of moving a movable beater assembly means of a harvesting machine in a back and forth movement, said method comprising the following steps:
   a. providing a housing structure;
   b. mounting eccentrically revolving weight assembly means to said housing structure for rotation of said weight assembly means;
   c. driving said beater assembly means in said back and forth movement in a manner that said movement exerts on said housing structure a beater assembly force which is directed along an alignment axis;
   d. rotating said weight means in a manner to exert on said housing structure a net compensating force that is colinear with said alignment axis so that said net compensating force, in a timed relationship with said back and forth movement of said beater assembly means, opposes colinearly said beater assembly force, whereby an equilibrium of said housing structure is able to be maintained.

11. The apparatus as recited in claim 10, wherein said weight assembly means comprises a first eccentrically revolving weight means and a second eccentrically revolving weight means.

12. The apparatus as recited in claim 11, wherein said beater assembly means is driven back and forth by rotation of an eccentric crank means which revolves about a crank axis, and said first and second weight means, respectively, rotate about first and second weight axes, said crank axis being separated from said weight axes.

13. The apparatus as recited in claim 11, wherein rotation of said first weight means is driven by first pulley means and rotation of said second weight means is driven by second pulley means; wherein said drive transmission means comprises belt means having an interior surface and an exterior surface, said interior surface engaging said first pulley means, an idler pulley means, and a driver which supplies driving power, and said exterior surface engaging said second pulley means.

* * * * *